(12) United States Patent
Liang et al.

(10) Patent No.: US 11,223,255 B2
(45) Date of Patent: Jan. 11, 2022

(54) ELECTRIC MOTOR AND FOOD PROCESSOR

(71) Applicant: GUANGDONG MIDEA CONSUMER ELECTRICS MANUFACTURING CO., LTD., Foshan (CN)

(72) Inventors: Xiantang Liang, Foshan (CN);
Liancheng Chen, Foshan (CN);
Congshan Pang, Foshan (CN);
Zhenfeng Yang, Foshan (CN);
Guangren Yang, Foshan (CN)

(73) Assignee: GUANGDONG MIDEA CONSUMER ELECTRICS MANUFACTURING CO., LTD., Foshan (CN)

( * ) Notice: Subject to any disclaimer, the term of this patent is extended or adjusted under 35 U.S.C. 154(b) by 0 days.

(21) Appl. No.: 16/968,751

(22) PCT Filed: Aug. 7, 2018

(86) PCT No.: PCT/CN2018/099243
§ 371 (c)(1),
(2) Date: Aug. 10, 2020

(87) PCT Pub. No.: WO2019/153672
PCT Pub. Date: Aug. 15, 2019

(65) Prior Publication Data
US 2020/0412201 A1    Dec. 31, 2020

(51) Int. Cl.
*H02K 7/116* (2006.01)
*H02K 7/08* (2006.01)
*A47J 43/08* (2006.01)

(52) U.S. Cl.
CPC ............ *H02K 7/1163* (2013.01); *A47J 43/08* (2013.01); *H02K 7/08* (2013.01)

(58) Field of Classification Search
CPC ... H02K 7/1163; H02K 7/08; H02K 7/10; A47J 43/08; F16H 1/222
(Continued)

(56) References Cited

U.S. PATENT DOCUMENTS 3,921,770 A * 11/1975 Daab .................... H02P 5/50
                                                         192/12 D
5,407,272 A    4/1995 Meier
(Continued)

FOREIGN PATENT DOCUMENTS

CN    201018351 Y    2/2008
CN    201368189 Y    12/2009
(Continued)

OTHER PUBLICATIONS

The European Patent Office (EPO) Extended Search Report for EP Application No. 18905845.6 dated Jan. 26, 2021 12 Pages.
(Continued)

*Primary Examiner* — Pedro J Cuevas
(74) *Attorney, Agent, or Firm* — Anova Law Group, PLLC (57) ABSTRACT

An electric motor includes a front end cover, a rotary output shaft extending through the front end cover from an inner cavity of the electric motor, and a gear transmission mechanism provided inside the inner cavity of the electric motor. The rotary output shaft includes an inner rotary shaft and an outer rotary shaft that are arranged concentrically. The gear transmission is in a transmission connection with the inner rotary shaft and the outer rotary shaft.

13 Claims, 5 Drawing Sheets

(58) Field of Classification Search
USPC .................................. 74/332, 640; 310/83
See application file for complete search history.

(56) References Cited

U.S. PATENT DOCUMENTS

| | | | | |
|---|---|---|---|---|
| 5,631,511 | A * | 5/1997 | Schulmann | F16H 1/32 310/83 |
| 7,118,506 | B2 * | 10/2006 | Zheng | B62D 5/008 475/18 |
| 7,211,016 | B2 * | 5/2007 | Yan | F16H 1/46 475/219 |
| 7,568,989 | B2 * | 8/2009 | Naka | B62D 5/008 475/28 |
| 7,705,499 | B2 * | 4/2010 | Drewe | F16D 49/08 310/75 D |
| 7,880,351 | B2 * | 2/2011 | Strueber | F16D 41/10 310/77 |
| 8,004,132 | B2 * | 8/2011 | Fukuoka | H02K 23/58 310/83 |
| 8,267,218 | B2 * | 9/2012 | Huang | B62D 5/0415 180/444 |
| 8,829,750 | B2 * | 9/2014 | Sherwin | H02K 1/223 310/80 |
| 2002/0185290 | A1 * | 12/2002 | Tang | B25F 5/001 173/216 |
| 2004/0095037 | A1 * | 5/2004 | Palmero | H02K 21/145 310/261.1 |
| 2011/0298322 | A1 * | 12/2011 | Sherwin | H02K 23/58 310/83 |
| 2014/0342867 | A1 * | 11/2014 | Sherwin | H02K 9/00 475/149 |
| 2015/0159312 | A1 | 6/2015 | Liu et al. | |
| 2015/0362043 | A1 | 12/2015 | Podurgiel et al. | |
| 2016/0156248 | A1 * | 6/2016 | Lueker | E06B 9/70 310/83 |

FOREIGN PATENT DOCUMENTS

| | | |
|---|---|---|
| CN | 201883428 U | 6/2011 |
| CN | 102758883 A | 10/2012 |
| CN | 204429390 A | 7/2015 |
| CN | 204429390 U | 7/2015 |
| CN | 105065637 A | 11/2015 |
| CN | 105498592 A | 4/2016 |
| CN | 106367312 A | 2/2017 |
| CN | 106732065 A | 5/2017 |
| ES | 2339098 A1 | 5/2010 |
| JP | A06070518 A | 3/1994 |
| JP | A07000789 A | 1/1995 |
| JP | H10257730 A | 9/1998 |
| JP | 2003206997 A | 7/2003 |

OTHER PUBLICATIONS

The European Patent Office (EPO) Supplementary Search Report for EP Application No. 18905845.6 dated Feb. 12, 2021 1 Page.
World Intellectual Property Organization (WIPO) International Search Report and Written Opinion for PCT/CN2018/099243 dated Nov. 16, 2018 15 Pages.
The State Intellectual Property Office of PRC (SIPO) The First Office Action For CN Application No. 201810140188.8 dated Jul. 24, 2020 16 Pages (Translation Included ).
Japan Patent Office (JPO) The Notice of Reasons for Refusal For JP Application No. 2020-542806 dated Aug. 24, 2021 8 Pages (Translation Included).

* cited by examiner

United States Patent US 11,223,255 B2

ELECTRIC MOTOR AND FOOD PROCESSOR

CROSS-REFERENCE TO RELATED APPLICATIONS

This application is a National Stage Entry under 35 U.S.C. § 371 of International Application No. PCT/CN2018/099243, filed Aug. 7, 2018, which claims priority to Chinese Application Nos. 201820250006.8 and 201810140188.8, both filed Feb. 11, 2018, the entire contents of all of which are incorporated herein by reference.

FIELD

The present disclosure relates to the field of household appliances, in particular to an electric motor and a food processor.

BACKGROUND

As science and technology are developed continuously and people's living standard is improved continuously, food processors with a dual-shaft beating function, such as wall breaking machines and soybean milk machines, etc., are used more and more widely. In such a food processor, an electric motor rotates and drives two shafts arranged concentrically, and two blades in a mixing cup are in a transmission connection with the two shafts respectively, so that the two blades perform beating operation simultaneously.

At present, the electric motor generally employs an external transmission mechanism to rotate and drive the two shafts arranged concentrically. Consequently, when the assembler assembles the food processor, the transmission mechanism may be impaired or even damaged easily. Of course, after the food processor is assembled, interference to the transmission assembly may occur due to loosening of other parts (e.g., electric wires) in the food processor. As a result, the normal operation of the transmission assembly is affected, and the service life of the entire machine is shortened.

SUMMARY

To overcome the above-mentioned drawbacks or defects in the prior art, the present disclosure provides an electric motor and a food processor. The electric motor can effectively protect the gear transmission mechanism, is helpful for improving the reliability and service life of the gear transmission mechanism, and thereby improve the reliability and service life of the food processor.

To attain the object described above, the present disclosure provides an electric motor, which comprises a front end cover and a rotary output shaft extending out through the front end cover from an inner cavity of the electric motor, where the rotary output shaft comprises an inner rotary shaft and an outer rotary shaft that are arranged concentrically, a gear transmission mechanism is further provided inside the inner cavity of the electric motor, and the gear transmission mechanism is in a transmission connection with the inner rotary shaft and the outer rotary shaft.

Optionally, the gear transmission mechanism comprises a gear bracket and gear transmission components, where the gear transmission components are accommodated in an inner cavity of the gear bracket, and the gear bracket is disposed in the inner cavity of the electric motor and fixedly mounted at the front end cover.

Optionally, the gear bracket is an enclosed cubical bracket.

Optionally, the inner rotary shaft extends through a bottom wall and a top wall of the gear bracket sequentially and extends out through a top wall of the front end cover, the outer rotary shaft is concentrically fitted outside the inner rotary shaft and extends out through the top wall of the gear bracket and the top wall of the front end cover, the gear transmission components comprise an inner shaft gear and an outer shaft gear that are fixedly fitted around outer circumference walls of the inner rotary shaft and the outer rotary shaft respectively, and the inner shaft gear and the outer shaft gear are in a transmission connection with each other.

Optionally, the gear transmission mechanism comprises an intermediate gear, which is pivotally mounted at a side wall of the gear bracket and engaged with the inner shaft gear and the outer shaft gear.

Optionally, the gear bracket comprises a first half-sectional bracket portion and a second half-sectional bracket portion that are sectioned along a half section defined by a central axis of the intermediate gear and a concentric axis of the inner rotary shaft and the outer rotary shaft that orthogonally cross each other.

Optionally, the outer circumference walls of the inner rotary shaft and the outer rotary shaft are respectively provided with an inner bearing set and an outer bearing set respectively arranged at the bottom wall and the top wall of the gear bracket, the rotary shaft of the intermediate gear is provided with an intermediate bearing set mounted at the side wall of the gear bracket.

Optionally, a bottom end of the inner shaft gear abuts against a top end of the inner bearing set, a top end of the outer shaft gear abuts against a bottom end of the outer bearing set, and the intermediate gear is engaged with the inner shaft gear and the outer shaft gear.

Optionally, all of the intermediate gear, the inner shaft gear, and the outer shaft gear are cone gears, and the horizontal inclination angles of the conical generatrices of the inner shaft gear and the outer shaft gear are not smaller than 45° and not greater than 60°.

Optionally, the rotation speed ratio of the outer rotary shaft to the inner rotary shaft is not smaller than 1/5 and not greater than 1.

The present disclosure further provides a food processor, which comprises an inner shaft stirring blade assembly, an outer shaft stirring blade assembly, and an electric motor, where the inner rotary shaft drives the inner shaft stirring blade assembly to rotate, and the outer shaft stirring blade assembly is in a transmission connection with the outer rotary shaft.

With the above technical solutions, in the electric motor provided in the present disclosure, the inner rotary shaft and the outer rotary shaft, which are arranged concentrically, extend out through the front end cover of the electric motor, the inner rotary shaft and the outer rotary shaft are in a transmission connection via the gear transmission mechanism, and the gear transmission mechanism is accommodated in the inner cavity of the electric motor. Thus, the gear transmission mechanism is integrated in the electric motor, and is effectively protected. As a result, not only a situation of impairing or damaging the gear transmission mechanism occurring due to the carelessness of the assembler can be prevent, but also the interference to the dual-shaft transmission assembly can be prevented when other parts (e.g., electric wires) in the food processor get loose. In that way, the reliability and service life of the gear transmission mechanism can be greatly improved, and the reliability and service life of the food processor can be improved.

Other features and advantages of the present disclosure will be further described in detail in the detailed description section.

BRIEF DESCRIPTION OF THE DRAWINGS

The accompanying drawings are provided here to facilitate further understanding on the present disclosure, and constitute a part of this document. They are used in conjunction with the following detailed description to explain the present disclosure, but shall not be comprehended as constituting any limitation to the present disclosure. In the figures:

FIGS. 2-5 are schematic diagrams illustrating the assembling process of the gear transmission components into the gear bracket, where

| Reference Numbers | | | |
|---|---|---|---|
| 2 | Inner rotary shaft | 3 | Outer rotary shaft |
| 4 | Gear bracket | | |
| 11 | Front end cover | 12 | Outer stator |
| 13 | Inner rotor | 14 | Back end cover |
| 51 | Inner shaft gear | 52 | Outer shaft gear |
| 53 | Intermediate gear | 61 | Inner bearing set |
| 62 | Outer bearing set | 63 | Intermediate bearing set |

DETAILED DESCRIPTION OF THE EMBODIMENTS

Hereinafter, some embodiments of the present disclosure will be described in detail with reference to the accompanying drawings. It should be understood that the embodiments described here are only provided to describe and explain the present disclosure rather than constituting any limitation to the present disclosure.

It is noted that the examples and the features in the examples in the present disclosure can be combined freely, provided that there is no confliction between them.

In the present disclosure, unless otherwise specified, the words that denote directions or orientations, such as "above," "below," "top," and "bottom," etc., are usually used to describe the relative position relations among the components with respect to the direction as set forth in the accompanying drawings or the vertical, plumb, or gravity direction.

Hereinafter the present disclosure will be described in detail in examples with reference to the accompanying drawings.

Figure 1:
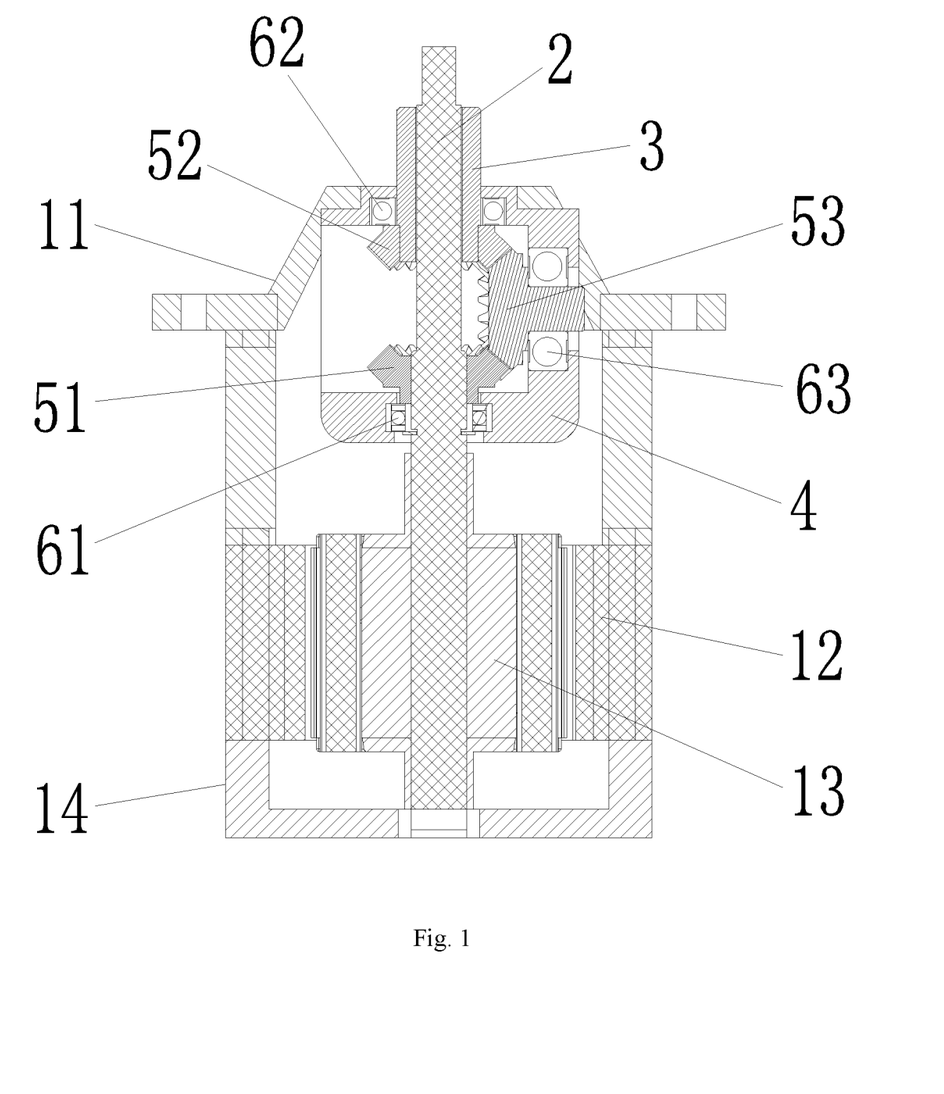
FIG. 1 is a general sectional view of the electric motor according to an embodiment of the present disclosure.

In one aspect, the present disclosure provides an electric motor. As shown in FIG. 1, the electric motor comprises a front end cover 11 and a rotary output shaft extending out through the front end cover 11 from an inner cavity of the electric motor, where the rotary output shaft comprises an inner rotary shaft 2 and an outer rotary shaft 3 that are arranged concentrically. a gear transmission mechanism is further provided inside the inner cavity of the electric motor, and the gear transmission mechanism is in a transmission connection with the inner rotary shaft 2 and the outer rotary shaft 3. Optionally, the rotation speed ratio of the outer rotary shaft 3 to the inner rotary shaft 2 is not smaller than ⅕ and not greater than 1.

In another aspect, the present disclosure provides a food processor. The food processor comprises an inner shaft stirring blade assembly, an outer shaft stirring blade assembly, and an electric motor, where the inner rotary shaft 2 drives the inner shaft stirring blade assembly to rotate, and the outer shaft stirring blade assembly is in a transmission connection with the outer rotary shaft 3. Where the food processor may be a wall breaking machine, natural juice extractor, juice extractor, soybean milk machine, blender, or any other household appliance, as long as the food processor is provided with an electric motor and has a food beating function.

In the technical solution of the present disclosure, the inner rotary shaft 2 and the outer rotary shaft 3 that are arranged concentrically rotate and drive the inner shaft stirring blade assembly and the outer shaft stirring blade assembly, respectively, and the inner shaft stirring blade assembly and the outer shaft stirring blade assembly are disposed in the mixing cup of the food processor, the rotor of the electric motor rotates and drives the rotary output shaft to drive the dual-stirring-blade assembly (i.e., the inner shaft stirring blade assembly and the outer shaft stirring blade assembly) to operate simultaneously so as to cut and beat the food accommodated in the mixing cup. The dual-shaft transmission mechanism composed of the inner rotary shaft 2 and the outer rotary shaft 3 in transmission connection is disposed in the inner cavity of the electric motor, i.e., the dual-shaft transmission mechanism is integrated in the electric motor. Thus, when the assembler assembles the food processor, the dual-shaft transmission mechanism is protected effectively, and thereby a situation of impairing or damaging the dual-shaft transmission mechanism due to the carelessness of the assembler can be avoided; in addition, after the food processor is assembled, interference to the dual-shaft transmission assembly can be effectively prevented when other parts (e.g., electric wires) in the food processor get loose. In that way, not only the reliability and service life of the dual-shaft transmission mechanism can be improved so as to improve the reliability and service life of the entire machine, but also the yield of the food processor can be effectively improved. Moreover, by integrating the dual-shaft transmission mechanism in the electric motor, the assembling speed of the assembler can be effectively improved, i.e., the assembler only has to assemble the electric motor integrated with the dual-shaft transmission mechanism into the food processor, without the extra need to assemble the dual-shaft transmission mechanism. Thus, the production efficiency of the food processor can be greatly improved. Of course, by integrating the dual-shaft transmission mechanism inside the electric motor, an additional internal space for accommodating the dual-shaft transmission mechanism is omitted in the food processor. That is to say, the internal space occupied in the food processor can be effectively reduced, the entire machine is smaller and more compact; in addition, the transportation and storage cost of the food processor can be reduced since the footprint of the entire machine is reduced.

Specifically, the dual-shaft transmission mechanism is a gear transmission mechanism. In such an arrangement, the gear transmission mechanism has a more outstanding technical effect than other transmission structures, such as belt-wheel transmission mechanisms. Hereinafter the technical effect of the dual-shaft transmission mechanism serving as a gear transmission mechanism will be described with a belt-wheel transmission mechanism as a comparative example. Specifically, a gear transmission mechanism realizes transmission by means of gear engagement, while a belt-wheel transmission mechanism requires a transmission belt between the wheels to realize transmission. Therefore, compared with a belt-wheel transmission mechanism, a gear transmission mechanism has a smaller and more compact structure since it does not require a transmission belt, and thereby the electric motor or even the entire machine is smaller and more compact. Furthermore, the transmission belt in a belt-wheel transmission mechanism gets slack gradually after years of operation, resulting in degradation or even loss of the transmission capability; in contrast, such a situation does not occur in a gear transmission mechanism. Therefore, compared with a belt-wheel transmission mechanism, the operation reliability of a gear transmission mechanism is higher, and the service life of a gear transmission mechanism is longer. Of course, since a gear transmission mechanism does not require a transmission belt for linkage, the transmission efficiency is higher.

Optionally, the electric motor comprises an inner rotor 13 and an outer stator 12, and the rotary shaft of the inner rotor 13 is the inner rotary shaft 2, as shown in FIG. 1. Therefore, compared with an electric motor with an outer rotor, an electric motor with an inner rotor 13 is smaller and more compact, and occupies a smaller space. Furthermore, the electric motor comprises a back end cover 14 fixed to the back end of the outer stator 12.

Specifically, the gear transmission mechanism comprises a gear bracket 4 and a gear transmission component accommodated in the inner cavity of the gear bracket 4, the gear bracket 4 is disposed in the inner cavity of the electric motor and fixedly mounted at the front end cover 11, as shown in FIG. 1. Thus, with the gear bracket 4 connected to the front end cover 11 fixedly, the gear bracket 4 and the front end cover 11 form an integral piece, so that the gear transmission components in the inner cavity of the bracket can carry out transmission smoothly, and thereby the inner rotary shaft 2 can smoothly transfer the rotational kinetic energy to the outer rotary shaft 3 via the gear transmission component. That is to say, the transmission between the inner rotary shaft 2 and the outer rotary shaft 3 is more smooth and stable, and the user experience can be improved. Of course, the smooth and stable transmission of the gear transmission components can effectively reduce the operation noise produced during gear transmission and is helpful for improving user experience. Moreover, since the gear transmission mechanism is accommodated in the inner cavity of the front end cover 11, it does not affect the transmission efficiency of the rotor and the stator in the electric motor.

Furthermore, as shown in FIG. 1, the gear bracket 4 is an enclosed cubical bracket. Specifically, to improve the reliability and service life of the gear transmission components, usually a lubricant is applied to the gear transmission components. Therefore, by configuring the gear bracket 4 into an enclosed bracket, interference to other parts in the electric motor due to dripping or splashing of the lubricant on the gear transmission component can be effectively avoided, and the reliability and service life of the electric motor can be improved. Moreover, the gear bracket 4 may be in a cubical shape, or in another shape, such as a spheroidal shape.

Optionally, the inner rotary shaft 2 extends through a bottom wall and a top wall of the gear bracket 4 sequentially and extends out through a top wall of the front end cover 11, the outer rotary shaft 3 is concentrically fitted outside the inner rotary shaft 2 and extends out through the top wall of the gear bracket 4 and the top wall of the front end cover 11, as shown in FIGS. 1-4, the gear transmission components comprise an inner shaft gear 51 and an outer shaft gear 52 that are fixedly fitted around outer circumference walls of the inner rotary shaft 2 and the outer rotary shaft 3 respectively, and the inner shaft gear 51 and the outer shaft gear 52 are in a transmission connection with each other.

Furthermore, the gear transmission mechanism further comprises an intermediate gear 53 as shown in FIGS. 1-5, which is pivotally mounted at a side wall of the gear bracket 4 and engaged with the inner shaft gear 51 and the outer shaft gear 52 respectively. In such an arrangement, the outer rotary shaft 3 can rotate in a reverse direction with respect to the inner rotary shaft 2, and thereby the inner shaft stirring blade assembly and the outer shaft stirring blade assembly have rotation directions opposite to each other. Thus, the rotation speeds of the dual-stirring-blade assembly in directions opposite to each other are superimposed, and the cutting speed of the dual-stirring-blade assembly with respect to the food particles is greatly increased. Therefore, the food can be cut to a finer state, and the rate of juice extraction from the food and the drinking taste can be improved. In other words, for an electric motor in which the inner rotary shaft 2 and the outer rotary shaft 3 rotate in directions opposite to each other, by greatly decreasing the rotation speed of the rotor 13 in the electric motor (e.g., to ½ of the original rotation speed), a food beating and crushing effect can also be attained even when the inner rotary shaft 2 and the outer rotary shaft 3 rotate in the same direction. By decreasing the rotor speed, the food processor can achieve the original food crushing effect while the noise produced during the operation of the main body of the electric motor is reduced. Furthermore, the decreased rotor speed can result in decreased rotation speed of the dual-stirring-blade assembly, and the vibration and noise produced during the food cutting operation of the dual-stirring-blade assembly can be reduced.

Specifically, all of the intermediate gear 53, the inner shaft gear 51, and the outer shaft gear 52 are cone gears. The intermediate gear 53, the inner shaft gear 51, and the outer shaft gear 52 may be straight-tooth cone gears or skewed-tooth cone gears, or other appropriate cone gears, such as arc-tooth cone gears.

In addition, as shown in FIG. 1, both of the horizontal inclination angles of the conical generatrices of the inner shaft gear 51 and the outer shaft gear 52 may be not smaller than 45° and not greater than 60°. The concentric axis of the inner shaft gear 51 and the outer shaft gear 52 and the central axis of the intermediate gear 53 orthogonally cross each other. The horizontal inclination angle of the conical generatrix of the inner shaft gear 51, the outer shaft gear 52, or the intermediate gear 53 refers to an acute included angle between the conical generatrix of the gear and the horizontal plane when the gear is placed horizontally (i.e., the central axis of the gear is perpendicular to the horizontal plane). Thus, the sum of the horizontal inclination angle of the conical generatrix of the inner shaft gear 51 or the outer shaft gear 52 and the horizontal inclination angle of the conical generatrix of the intermediate gear 53 may be 90°. In that way, if both of the horizontal inclination angles of the conical generatrices of the inner shaft gear 51 and the outer shaft gear 52 are 60°, the horizontal inclination angle of the conical generatrix of the intermediate gear 53 is 30°. Optionally, both of the horizontal inclination angles of the conical generatrices of the inner shaft gear 51 and the outer shaft gear 52 are 45°. Thus, the inner shaft gear 51, the outer shaft gear 52, and the intermediate gear 53 can be designed to be interchangeable, i.e., the assembler only needs to mount gears to the positions where gears are to be mounted, without speeding any additional time and effort to artificially judge the types of the gears and the corresponding mounting positions. Furthermore, both the horizontal inclination angles of the conical generatrices of the inner shaft gear 51 and the outer shaft gear 52 are greater than 45° and not greater than 60°, i.e., the horizontal inclination angle of the conical generatrix of the intermediate gear 53 is smaller than 45°. Thus, the intermediate gear 53 may be designed to be smaller, and the height of the gear bracket 4 may be designed to be smaller, and thereby the structure of the electric motor can be smaller and more compact. Of course, the space occupied by the electric motor is smaller, the accommodating space of the food processor can be reduced, and thereby the transportation and storage cost of the entire machine can be reduced.

It should be noted that there are a variety of ways to arrange the gear transmission components. For example, the above-mentioned inner shaft gear 51 and outer shaft gear 52 are engaged and carry out transmission via the intermediate gear 53; or an outer gear may be provided on the inner rotary shaft 2, an inner gear may be formed on the bottom end of the outer rotary shaft 3, a connecting gear may be pivotally arranged at the bottom wall of the gear bracket 4 and engaged with the inner gear and the outer gear respectively.

Optionally, the speed ratio of the outer rotary shaft 3 to the inner rotary shaft 2 may not be smaller than ⅕ and not greater than 1. Thus, the food accommodated in the mixing cup can be cut to a finer state by the dual-stirring-blade assembly, and thereby a better taste can be obtained while more juice can be squeezed from the food, and the user experience can be improved greatly. Furthermore, the speed ratio of the outer rotary shaft 3 to the inner rotary shaft 2 may be not smaller than ⅓ and not greater than ¾. It can be understood that the higher the speed ratio of the outer rotary shaft 3 to the inner rotary shaft 2 is, the better the food beating and crushing effect of the dual-stirring-blade assembly is; but the speed of impact of the food on the mixing cup body under the driving action of the high-speed dual-stirring-blade assembly will be increased, and thereby the noise produced during the operation of the entire machine will be increased. Therefore, by confining the speed ratio of the outer rotary shaft 3 to the inner rotary shaft 2 to the above-mentioned range, not only a good food beating and crushing effect can be attained, but also the noise during the beating operation can be reduced.

Figure 2:
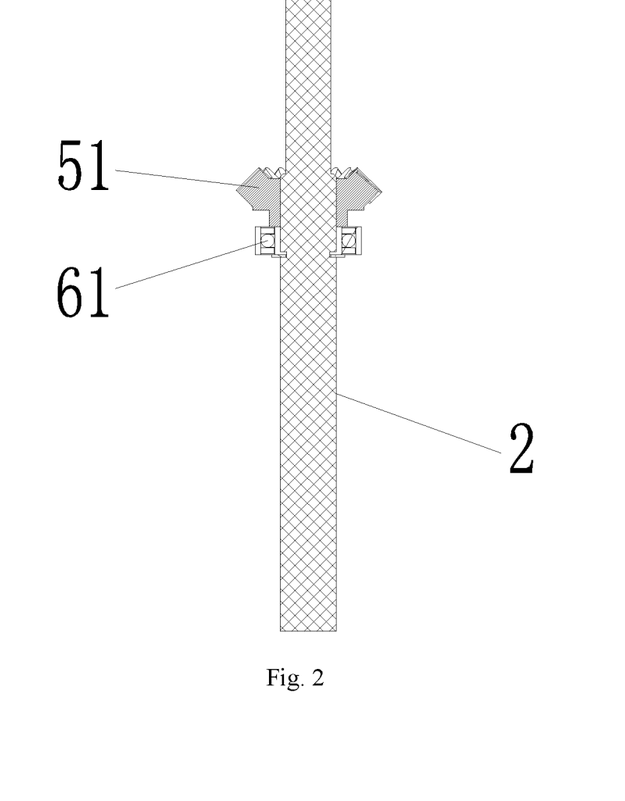
FIG. 2 is a sectional view illustrating the inner shaft gear and the inner bearing set arranged at the outer circumference wall of the inner rotary shaft.
Figure 3:
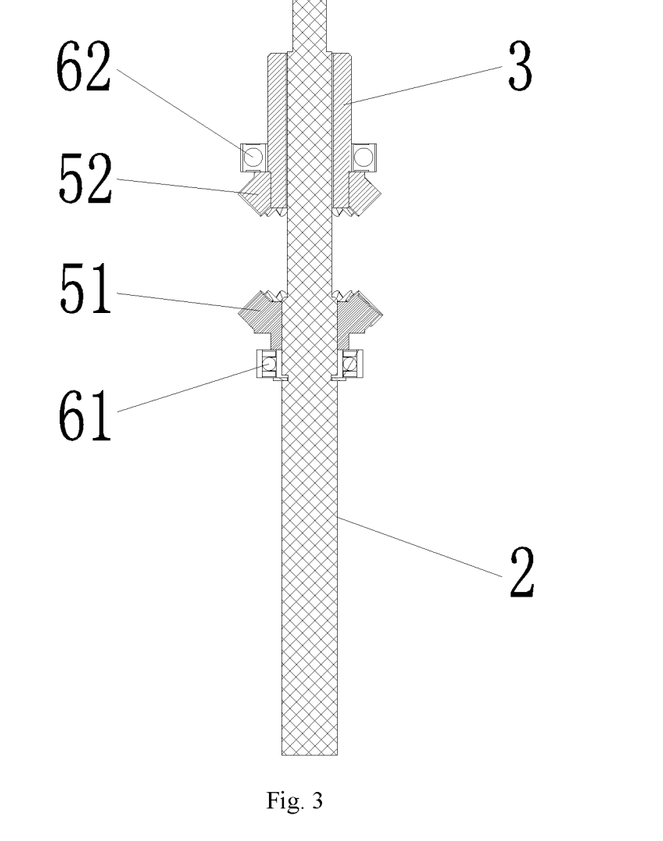
FIG. 3 is a sectional view illustrating the outer rotary shaft with the outer shaft gear and the outer bearing set fitted outside the inner rotary shaft.
Figure 4:
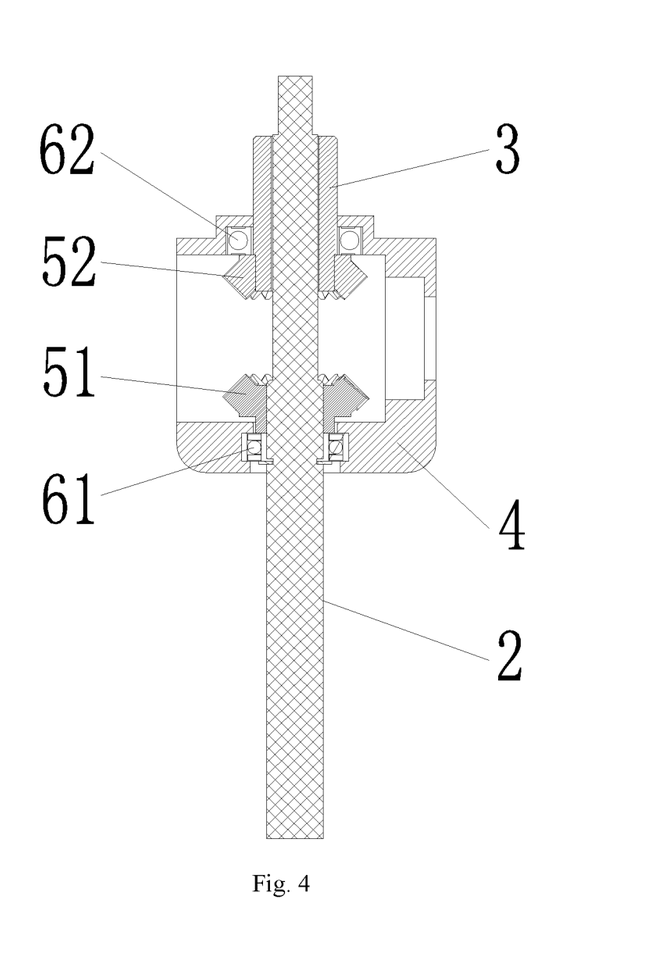
FIG. 4 is a sectional view illustrating the assembling of the inner rotary shaft and the outer rotary shaft into the first half-sectional bracket portion.
Figure 5:
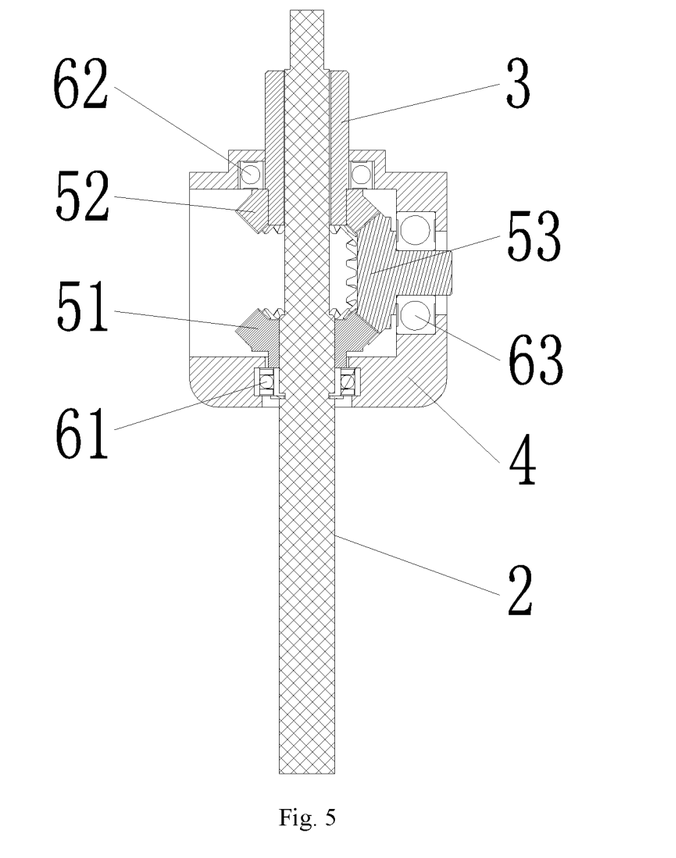
FIG. 5 is a sectional view illustrating the assembling of the intermediate gear with the intermediate bearing set into the first half-sectional bracket portion after the intermediate gear is engaged with the inner shaft gear and the outer shaft gear respectively.

To facilitate the assembler to mount the gear transmission components into the gear bracket 4, optionally, as shown in FIGS. 1-5, the gear bracket 4 comprises a first half-sectional bracket portion and a second half-sectional bracket portion that are sectioned along a half section defined by the central axis of the intermediate gear 53 and the concentric axis of the inner rotary shaft 2 and the outer rotary shaft 3 that orthogonally cross each other. Specifically, the outer rotary shaft 3 with the outer shaft gear 52 is fitted around the inner rotary shaft 2 with the inner shaft gear 51, as shown in FIGS. 2 and 3, and then the inner rotary shaft 2 and the outer rotary shaft 3 are mounted to corresponding positions in the first half-sectional bracket portion, as shown in FIG. 4; the intermediate gear 53 is engaged with the outer shaft gear 52 and the inner shaft gear 51 respectively by utilizing an external space, then the intermediate gear 53 is turned around the concentric axis of the outer rotary shaft 3 and the inner rotary shaft 2 that serves as a central axis, and thereby the intermediate gear 53 is mounted to a corresponding position in the first half-sectional bracket portion, as shown in FIG. 5; finally, the second half-sectional bracket portion and the first half-sectional bracket portion are assembled to form the gear bracket 4. With such a ground-breaking assembling method, the assembler can mount the gear transmission components into the gear bracket 4 easily, and the assembling efficiency is high.

Optionally, the outer circumference walls of the inner rotary shaft 2 and the outer rotary shaft 3 are respectively provided with an inner bearing set 61 and an outer bearing set 62 that are respectively arranged at the bottom wall and top wall of the gear bracket 4, the rotary shaft of the intermediate gear 53 is provided with an intermediate bearing set 63 mounted at the side wall of the gear bracket 4, as shown in FIGS. 1 and 5. Thus, with the inner bearing set 61 being arranged between the outer circumference wall of the inner rotary shaft 2 and the gear bracket 4, radial support is provided to the inner rotary shaft 2, the accuracy of rotation of the inner rotary shaft 2 can be improved, and thereby a situation of instable transmission of the inner rotary shaft 2 can be avoided; moreover, in that way, the friction coefficient between the inner rotary shaft 2 and the gear bracket 4 in the process of rotation can be effectively decreased, the inner rotary shaft 2 can rotate smoothly in the gear bracket 4, and the user experience can be improved. Likewise, with the outer bearing set 62 being arranged between the outer circumference wall of the rotating shaft 3 and the gear bracket 4 and arranging the intermediate bearing set 63 between the outer circumference wall of the rotary shaft of the intermediate gear 53 and the gear bracket 4, the accuracy of rotation of the outer rotary shaft 3 and the rotary shaft of the intermediate gear 53 can be improved, the outer rotary shaft 3 and the rotary shaft of the intermediate gear 53 can rotate smoothly in the gear bracket 4, and thereby the user experience can be improved.

In addition, as shown in FIG. 1, the bottom end of the inner shaft gear 51 abuts against the top end of the inner bearing set 61, the top end of the outer shaft gear 52 abuts against the bottom end of the outer bearing set 62, and the intermediate gear 53 is engaged with both the inner shaft gear 51 and the outer shaft gear 52. Thus, a situation of axial displacement (i.e., upward and downward movement) of the outer shaft gear 52 and the inner shaft gear 51 can be effectively prevented during the operation of the electric motor, the transmission stability and reliability of the gear transmission mechanism can be improved, and thereby the reliability of the entire machine can be improved.

It should be noted particularly that the other components and their functions of the electric motor and food processor according to the examples of the present disclosure are known to those having ordinary skilled in the art, and will not be described in detail here to reduce redundancy.

While the present disclosure is described above with some examples, the present disclosure is not limited to those embodiments. Any modification, equivalent replacement, and improvement made without departing from the spirit and principle of the present disclosure shall be deemed as falling in the scope of the present disclosure.

In addition, it should be noted that the specific technical features described in above specific detailed description may be combined in any appropriate form, provided that there is no conflict among them. To avoid unnecessary repetition, various possible combinations are not described specifically in the present disclosure.

Moreover, different embodiments of the present disclosure may also be combined freely as required, as long as the combinations don't deviate from the ideal and spirit of the present disclosure. However, such combinations shall also be deemed as falling in the scope of the present disclosure.

The invention claimed is:

1. An electric motor comprising:
   a front end cover;
   a rotary output shaft extending through the front end cover from an inner cavity of the electric motor, the rotary output shaft including an inner rotary shaft and an outer rotary shaft that are arranged concentrically; and
   a gear transmission mechanism provided inside the inner cavity of the electric motor and in a transmission connection with the inner rotary shaft and the outer rotary shaft.

2. The electric motor of claim 1, wherein the gear transmission mechanism includes:
   a gear bracket disposed in the inner cavity of the electric motor and fixedly mounted at the front end cover; and
   a gear transmission component accommodated in an inner cavity of the gear bracket.

3. The electric motor of claim 2, wherein the gear bracket includes an enclosed cubical bracket.

4. The electric motor of claim 2, wherein:
   the inner rotary shaft extends through a bottom wall and a top wall of the gear bracket, and extends out of the inner cavity of the electric motor through a top wall of the front end cover;
   the outer rotary shaft is concentrically fitted outside the inner rotary shaft and extends through the top wall of the gear bracket and the top wall of the front end cover; and
   the gear transmission component includes:
      an inner shaft gear fixedly fitted around an outer circumference wall of the inner rotary shaft; and
      an outer shaft gear fixedly fitted around an outer circumference wall of the outer rotary shaft and in a transmission connection with the inner shaft gear.

5. The electric motor of claim 4, wherein the gear transmission mechanism further includes an intermediate gear pivotally mounted at a side wall of the gear bracket and engaged with the inner shaft gear and the outer shaft gear.

6. The electric motor of claim 5, wherein the gear bracket includes a first half-sectional bracket portion and a second half-sectional bracket portion that are sectioned along a plane defined by a central axis of the intermediate gear and a concentric axis of the inner rotary shaft and the outer rotary shaft.

7. The electric motor of claim 6, wherein the central axis of the intermediate gear and the concentric axis of the inner rotary shaft and the outer rotary shaft orthogonally cross each other.

8. The electric motor of claim 5, further comprising:
   an inner bearing set provided at the outer circumference wall of the inner rotary shaft and arranged at the bottom wall of the gear bracket;
   an outer bearing set provided at the outer circumference wall of the outer rotary shaft and arranged at the top wall of the gear bracket; and
   an intermediate bearing set provided at a rotary shaft of the intermediate gear and mounted at the side wall of the gear bracket.

9. The electric motor of claim 8, wherein a bottom end of the inner shaft gear abuts against a top end of the inner bearing set, and a top end of the outer shaft gear abuts against a bottom end of the outer bearing set.

10. The electric motor of claim 5, wherein each of the intermediate gear, the inner shaft gear, and the outer shaft gear include a cone gear.

11. The electric motor of claim 10, wherein a horizontal inclination angle of a conical generatrix of each of the inner shaft gear and the outer shaft gear is not smaller than 45° and not greater than 60°.

12. The electric motor of claim 1, wherein a rotation speed ratio of the outer rotary shaft to the inner rotary shaft is not smaller than 1/5 and not greater than 1.

13. A food processor comprising:
   an electric motor including:
      a front end cover;
      a rotary output shaft extending through the front end cover from an inner cavity of the electric motor, the rotary output shaft including an inner rotary shaft and an outer rotary shaft that are arranged concentrically; and
      a gear transmission mechanism provided inside the inner cavity of the electric motor and in a transmission connection with the inner rotary shaft and the outer rotary shaft;
   an inner shaft stirring blade assembly coupled to the inner rotary shaft and configured to be driven by the inner rotary shaft to rotate; and
   an outer shaft stirring blade assembly in a transmission connection with the outer rotary shaft.

* * * * *